United States Patent [19]

Mittenthal

[11] Patent Number: 5,038,376
[45] Date of Patent: Aug. 6, 1991

[54] BLOCK SUBSTITUTION BASED ENCRYPTION BY A MODULO 2 ADDITION METHOD AND APPARATUS

[75] Inventor: Lothrop Mittenthal, Thousand Oaks, Calif.

[73] Assignee: Teledyne Industries, Inc., Northridge, Calif.

[21] Appl. No.: 416,953

[22] Filed: Oct. 4, 1989

[51] Int. Cl.$^5$ .............................................. H04K 1/04
[52] U.S. Cl. ........................................ 380/37; 380/28; 380/49
[58] Field of Search ....................... 380/28, 36, 37, 42, 380/49

[56] References Cited

U.S. PATENT DOCUMENTS

| | | | |
|---|---|---|---|
| 4,322,577 | 3/1982 | Brärdström | 380/28 |
| 4,685,132 | 8/1987 | Bishop et al. | 380/49 X |
| 4,797,921 | 1/1989 | Shiraishi | 380/28 |
| 4,932,056 | 6/1990 | Shamir | 380/28 X |

Primary Examiner—Thomas H. Tarcza
Assistant Examiner—Tod Swann
Attorney, Agent, or Firm—Blakely, Sokoloff, Taylor & Zafman

[57] ABSTRACT

Methods and apparatus for modulo 2 addition based encryption by block substitution techniques which allows use of the substitution scheme with relatively simple hardware. The block substitution, a one to one mapping of n bit binary numbers onto themselves, is based on the fact that certain permutations of the n bit binary numbers define a block substitution by modulo 2 addition of one permuted set of numbers to another, and that a subset of these define equations having an additive relationship when viewed as vectors. This allows the simple changing of the transformation on a frequent basis. Various properties of the transformations and methods of using the same are disclosed.

12 Claims, 10 Drawing Sheets

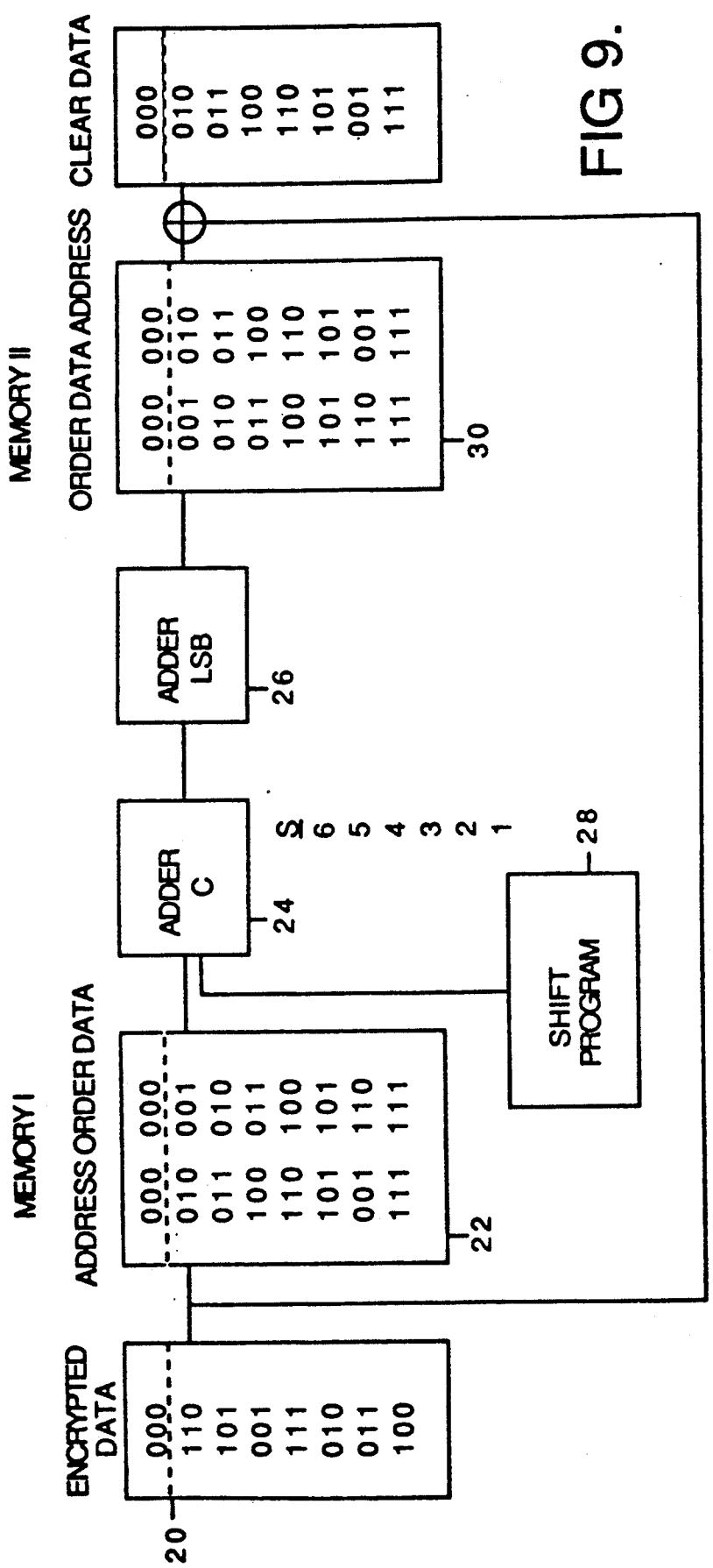

BLOCK SUBSTITUTION BASED ENCRYPTION BY A MODULO 2 ADDITION METHOD AND APPARATUS

BACKGROUND OF THE INVENTION

1. Field of the Invention

The present invention relates to the field of encryption devices and methods, and more particularly, to block substitution encryption methods and devices.

2. Prior Art

In many cases, it is desired to communicate information in digital form from one location to another in a manner which is clear and unambiguous to the receiver, but which is incomprehensible to an interloper therebetween. Accordingly, in many instances, it is common to encrypt the information to be communicated by some predetermined encryption process, to transmit the encrypted form of the information and to then decrypt the information at the receiving location. Depending upon the degree of security desired, a relatively simple and easily broken encryption may be used, as any level of encryption will make the transmission meaningless to the casual interloper. In other situations, the degree of security desired may dictate the use of an encryption technique which is more difficult to decipher by cryptanalysis, or of course hopefully in the highest level of security, make the same substantially impossible to decipher. Applications for such encryption techniques include commercial applications such as sensitive communications between manufacturing plants, bank branches, etc., and military applications including but not limited to IFF (identification friend or foe). While in some cases the primary objective of the encryption is to prevent an interloper from deciphering the information being communicated, in other cases a primary object, such as in IFF, is to prevent the interloper from himself originating false information with the same encryption scheme so as to mislead the intended receiver. Both objectives are frequently present in many applications.

Block substitution is a method used to encrypt a clear text message which is in the form of a sequence of binary numbers. In accordance with the method, the sequence is broken into blocks of some predetermined block length n, with the block substitution device substituting a unique new block of binary numbers for each of those in the clear text. Substitute blocks constitute the encrypted message or cipher text, each substitute block representing a nonambiguous one-to-one transformation of a clear text block. In the prior art, such substitution generally takes place by means of look-up tables, switching arrangements, or feedback shift registers. However, without changing codes or substitution schemes frequently, the encryption may be broken by cryptanalysis, though, changing look-up tables is cumbersome, only a limited number of possible switching arrangements is practical, and repeated cycling of a shift register is time consuming. An additional problem arises in finding substitutions which do not have any pattern or bias in them. At the present time, candidate substitutions are examined by computer simulation for possible systematic patterns and in some cases, additional circuitry is used to compensate therefor.

Various types of encryption equipment and methods are well-known in the prior art. See for instance U.S. Pat. Nos. 3,796,830, 3,798,359, 4,078,152, 4,195,200, 4,255,811, 4,316,055 and 4,520,232. In general, these systems as they relate to block substitution are key dependent ciphering and deciphering systems and are not based upon block substitution by modulo 2 addition of one additive permuted set of numbers to another, as in the present invention.

BRIEF DESCRIPTION OF THE INVENTION

Methods and apparatus for modulo 2 addition based encryption by block substitution techniques which allows use of the substitution scheme with relatively simple hardware. The block substitution, a one to one mapping of n bit binary numbers onto themselves, is based on the fact that certain permutations of the n bit binary numbers define a block substitution by modulo 2 addition of one permuted set of numbers to another, and that a subset of these define equations having an additive relationship when viewed as vectors. This allows the simple changing of the transformation on a frequent basis. Various properties of the transformations and methods of using the same are disclosed.

BRIEF DESCRIPTION OF THE DRAWINGS

FIG. 1 illustrates a many-one transformation of one set of three bit binary numbers to another set of binary numbers by a modulo 2 addition.

FIG. 2 illustrates a one-to-one transformation of one set of three bit binary numbers to another set of binary numbers by a modulo 2 addition.

FIG. 3 presents the transformation equations of FIG. 2 reordered, excluding the first equation, making the three digit number in the first column the same as the three digit number in the second column of the preceding row. Excluding the first equation, each column now is in the same order but with different starting positions.

FIG. 4 corresponds to FIG. 3, though with the first and third columns shifted vertically with respect to the second column. These shifts are 6 and 2 positions downward respectively. Except for the first equation, each column remains in the same order but with different starting positions.

FIG. 5 corresponds to FIG. 4, with the $\oplus$ and $=$ symbols interchanged for encryption purposes.

FIG. 9 is an example of decryption using FIG. 7.

FIG. 10 presents a set of transformation equations corresponding to those of FIG. 4 with the fixed word 001 added to columns 1 and 2 thereof. Except for the first equation, columns 1 and 2 are in the same order but with different starting positions.

DETAILED DESCRIPTION OF THE INVENTION

Figure 6:
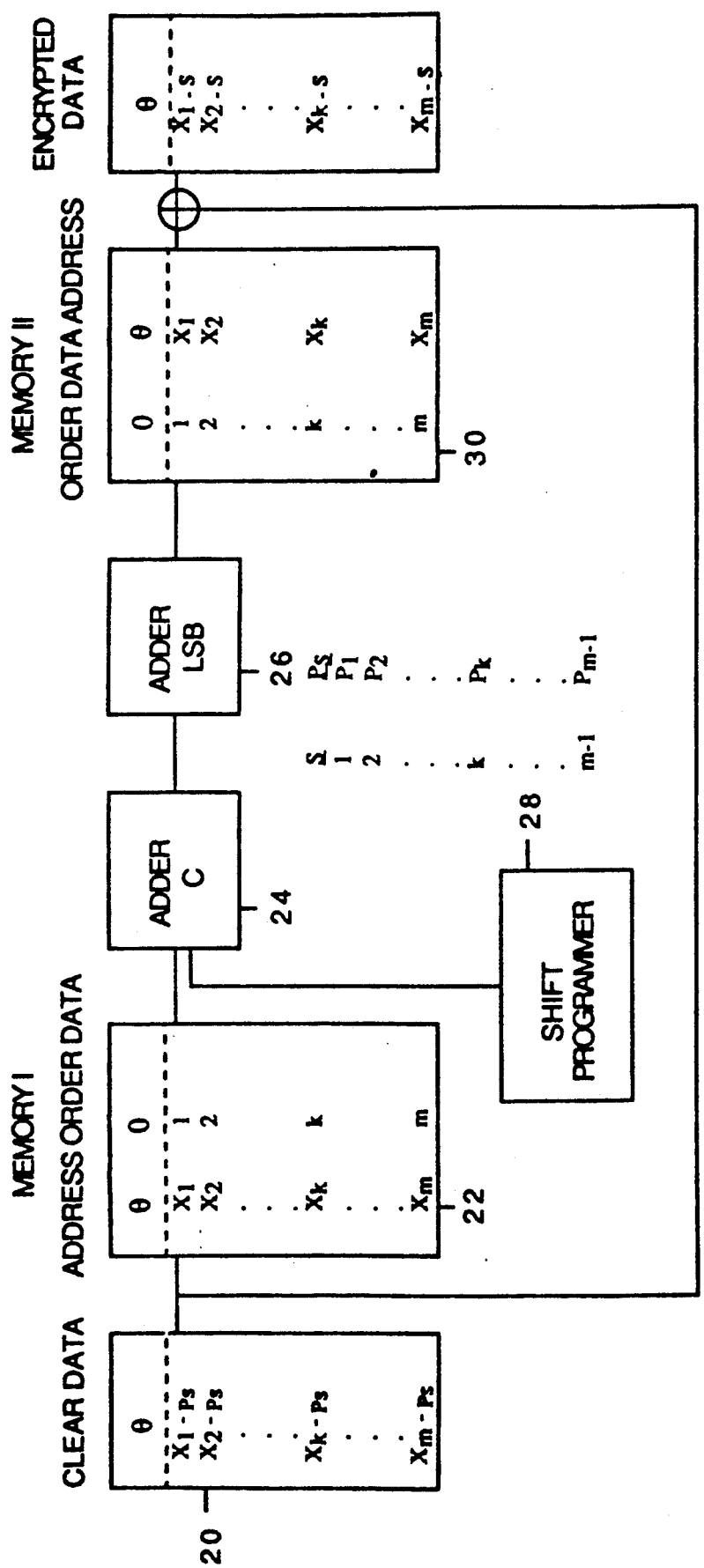
FIG. 6 is a block diagram of an apparatus for encrypting data.

In the description to follow, the methods and apparatus of the present invention will first be described with respect to blocks of n bit binary numbers where the value of n is 3. Then the methods and apparatus will be expanded to n bit blocks generally, and certain characteristics of blocks up to n=8 will be presented. By presenting the following example for n=3, it is believed that the concepts of the invention may be better understood than would be the case if a larger block having many more combinations were used.

Block substitution is the term usually applied to a one-to-one mapping of the n-bit binary numbers onto themselves. This mapping can be written as a pairing of the $2^n$ n-bit numbers:

$$\begin{array}{cc} X_1 & Z_1 \\ X_2 & Z_2 \\ \cdot & \cdot \\ \cdot & \cdot \\ \cdot & \cdot \\ X_k & Z_k \\ \cdot & \cdot \\ \cdot & \cdot \\ \cdot & \cdot \end{array}$$

where each column is the set of the same $2^n$ distinct n-bit numbers but written in different orders. Thus, this mapping can be thought of as a permutation of the n-bit numbers written as:

$$\begin{pmatrix} X_1 \, X_2 \ldots X_k \\ Z_1 \, Z_2 \ldots Z_k \end{pmatrix}$$

or $(X_1 X_i X_j)$ for some set of indices. This usual notation for permutations simply means that $X_1 \rightarrow X_i, X_i \rightarrow X_j$, etc.

Going back to the column notations, one could define a set of simple equations from the original set and its image:

$$\begin{array}{ccccc} Y_1 & \oplus & X_1 & = & Z_1 \\ Y_2 & \oplus & X_2 & = & Z_2 \\ & & \cdot & & \\ & & \cdot & & \\ & & \cdot & & \\ Y_k & \oplus & X_k & = & Z_k \\ & & \cdot & & \\ & & \cdot & & \\ & & \cdot & & \end{array}$$

where $\oplus$ means modulo 2 addition (i.e., addition of corresponding digits without any carry). In general, the set $\{Y_1, Y_2 \ldots\}$ will not all be distinct, but in certain circumstances they will be. In accordance with the present invention, when they are distinct, block substitutions can be generated by modulo 2 addition rather than by conventional means. The main tasks are to determine the circumstances, if any, in which this scheme works, how the substitutions can be quickly changed, and the lack of bias.

It is not obvious that block substitutions can ever be generated by modulo 2 addition. For example, consider the attempt to substitute one arrangement of 3-bit binary numbers for another by modulo 2 addition shown in FIG. 1. In column 3 on the right, 011 and 100 each appear twice, while 001 and 110 never appear. The numbers in column 1 on the left, acting on the numbers in column 2 in the center, constitute a transformation of the set of 3-bit binary words of column 1 into themselves. This is a many-one transformation and is useless for block substitutions because of the ambiguity that results when trying to recover the original block for the transformed blocks 011 and 100.

Figures 1, 2, 3, 4:
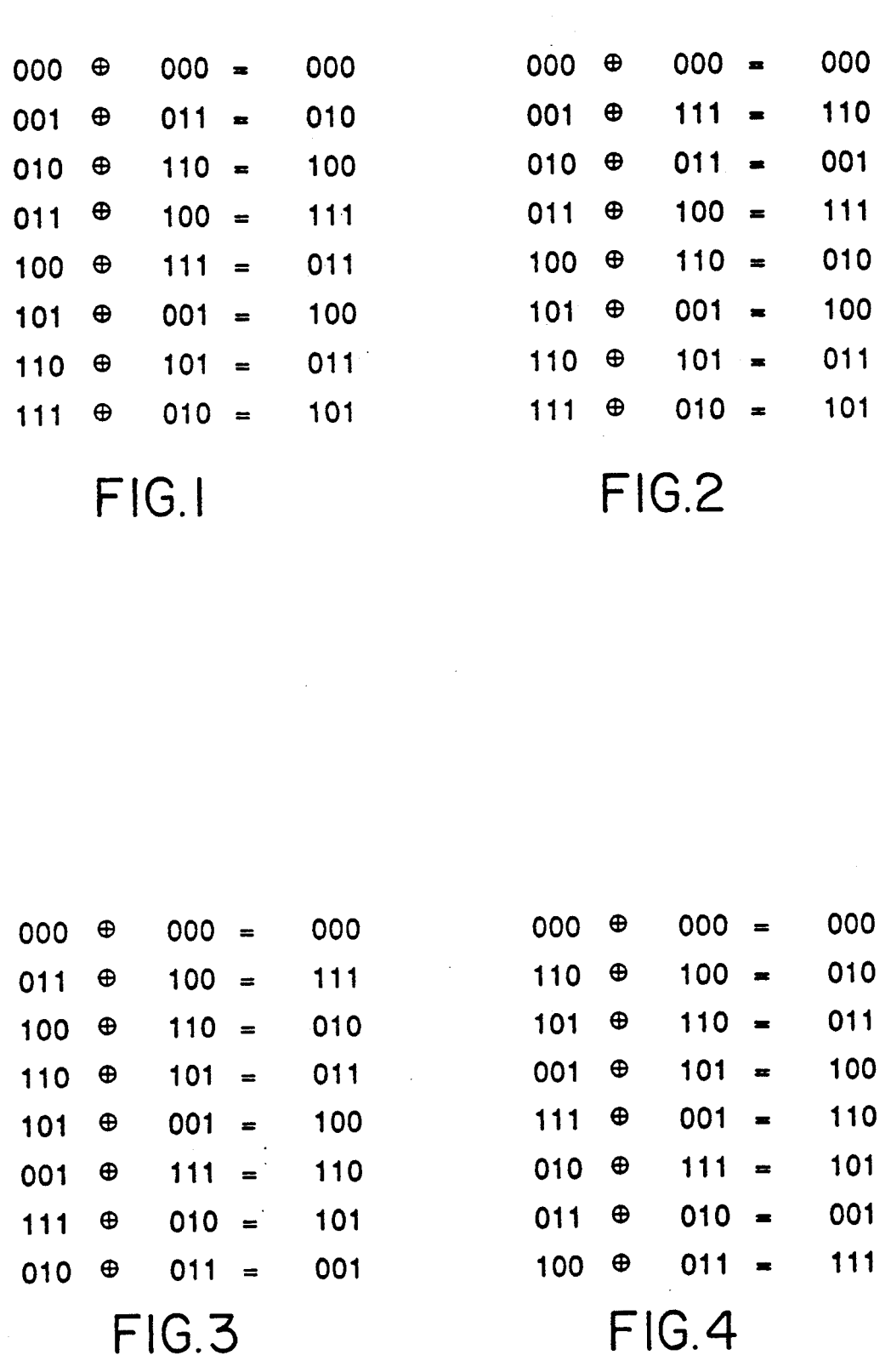

Trying another arrangement as shown in FIG. 2 gives a different result. Any pair of columns now constitutes a one-to-one transformation. In particular, the transformation is one-to-one from the 3-bit binary numbers of column 3 (the clear text) onto themselves, the encrypted text of column 1. Each column consists of all the 3-bit numbers exactly once.

Figure 5:
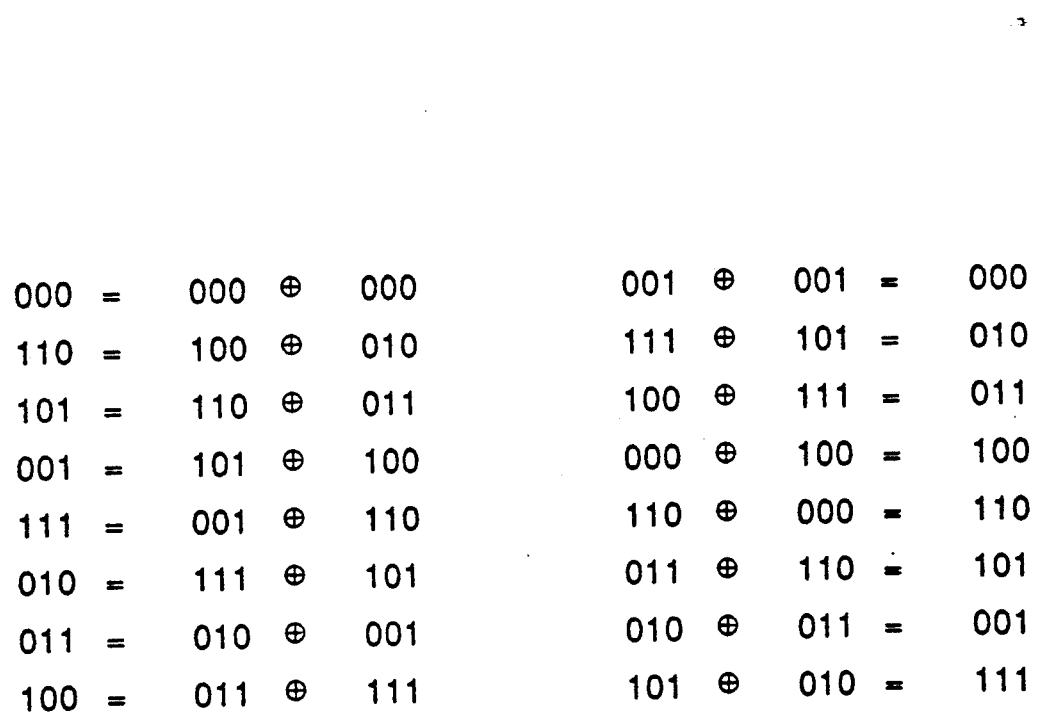

Obviously, one could use the transformations of FIG. 2 to transform any three digit binary block into an encrypted binary block, and of course use the same equations to de-encrypt the encrypted message by finding the encrypted word in column 1 and then selecting the corresponding clear text word in the same row, column 3 of FIG. 2. This is most convenient if $\oplus$ and $=$ are interchanged as shown in FIG. 5. An equivalent transformation to transform the encrypted word back to the clear text word results if the words of column one are added to those of column two to obtain those in column three.

Referring again to FIG. 2, an interesting property of the transformation shown therein, and for that matter, for all transformations of the type of interest herein, may be seen. In particular, of the eight blocks of three binary numbers, the lower four blocks 000, 001, 010 and 011 map into two blocks of the lower four, namely 000 and 001, and two blocks of the upper four, namely 110 and 111. Similarly of course, the four larger blocks of the eight map two into blocks in the lower four, and two into blocks of the upper four. Similarly, the even blocks 000, 010, 100 and 110 map into two even blocks, 000 and 010, and into two odd blocks, 001 and 011. The odd four blocks map half into odd blocks and half into even blocks. Obviously for decryption, the same is true. Thus, knowledge of some characteristic of the encrypted block such as its being large, small, even, odd, etc., does not convey any similar knowledge of a characteristic of the unencrypted block. As a result of this, the encryption is said to be unbiased. For that matter it should be noted that, even considering the middle digit of each block, the four blocks of FIG. 2 having a zero as the middle digit map two blocks into blocks also having a zero as a middle digit, and two blocks having one as the middle digit. Similarly of course, the four blocks having a one as the middle digit map two into blocks having a one as a middle digit, and two into blocks having a zero as the middle digit. This property applies to all block sizes and extends to dividing equally all set of blocks which may be characterized algebraically as maximal subgroups. This unbiased character of the encryption is a highly beneficial characteristic of the encryption scheme disclosed herein, particularly in conjunction with the frequent changing of the encryption from time to time.

In particular, in any practical encryption device of course, one would like to be able to frequently change the encryption scheme so that patterns will not persist for a sufficient length of time to allow cryptanalysis of the pattern. For this purpose, certain properties of the equations of FIG. 2 may be recognized by rearranging the rows of FIG. 2 as shown in FIG. 3. Rearrangement of the rows in any manner of course does not effect the transformation in any way, as each of the equations maintains its own integrity separate and apart from its position in the table. In essence, the second row of FIG.

3 is the 4th row in FIG. 2 and the third row of FIG. 3 is the fifth row in FIG. 2, with each successive row being arranged so that the left column in each successive row contains the same 3 bit number as the second column of the preceding row. When so arranged, neglecting the first or identity row, it will be noted that each of the three columns contains the same sequence of the 3 bit binary numbers, with wrap-around. In particular, the first column has the same sequence as the second column, but displaced downward therefrom one position (or upward six positions), and the third column has the same sequence as the second column, though displaced downward three positions (or upward four positions) from the sequence of column two.

Neglecting the first row or identity row of FIG. 3 again, if the 3 bit binary numbers in column 1 are shifted downward a total of six positions with wrap-around with respect to the second column, it will be noted that a one to one transformation still results, as shown in FIG. 4. Except for the identity row, the transformation is entirely different from that of FIG. 3. By way of example, 111 column 3 maps into 011 column 1 in FIG. 3, and maps into 100 column 1 in FIG. 4. In addition however, it is important to note that the sequence of the 3 digit numbers in columns 1 and 3 of FIG. 4 (separating out the identify row) is still the same as that in column 2 of FIGS. 3 and 4, though each is shifted with wrap-around in comparison to column 2. Thus, the transformation of FIG. 3 has been changed to the new transformation of FIG. 4 by merely shifting the numbers in the first column of FIG. 3 with respect to those in the second column, and with the numbers in the third column also being shifted with respect to those in the second column, but by a different amount to preserve the integrity of the modulo 2 addition equations. Again, for decryption, symbols $\oplus$ and $=$ of FIG. 4 can be interchanged as in FIG. 5.

More generally for any block size, the sets of equations can be written as:

ENCRYPTION

| <u>1</u> | | <u>2</u> | | <u>3</u> |
|---|---|---|---|---|
| $\theta$ | = | $\theta$ $\oplus$ | | $\theta$ |
| $X_{1-s}$ | = | $X_1$ $\oplus$ | | $X_{1-P_s}$ |
| $X_{2-s}$ | = | $X_2$ $\oplus$ | | $X_{2-P_s}$ |
| . | | . | | . |
| . | | . | | . |
| . | | . | | . |
| $X_{k-s}$ | = | $X_k$ $\oplus$ | | $X_{k-P_s}$ |
| . | | . | | . |
| . | | . | | . |
| . | | . | | . |
| $X_{m-s}$ | = | $X_m$ $\oplus$ | | $X_{m-P_s}$ |

$\theta = 00\ldots00$

DECRYPTION

-continued

| <u>1</u> | | <u>2</u> | | <u>3</u> |
|---|---|---|---|---|
| $\theta$ | $\oplus$ | $\theta$ | = | $\theta$ |
| $X_{1-s}$ | $\oplus$ | $X_1$ | = | $X_{1-P_s}$ |
| $X_{2-2}$ | $\oplus$ | $X_2$ | = | $X_{2-P_s}$ |
| . | | . | | . |
| . | | . | | . |
| . | | . | | . |
| $X_{k-s}$ | $\oplus$ | $X_k$ | = | $X_{k-P_s}$ |
| . | | . | | . |
| . | | . | | . |
| . | | . | | . |
| $X_{m-s}$ | $\oplus$ | $X_m$ | = | $X_{m-P_s}$ |

For block size n, $m=2^n-1$. $\theta=00\ldots00$, the n bit word consisting of all zeroes.

If column 1 is shifted by S positions with respect to column 2, then column 3 is shifted by a different amount $P_s$ to preserve the integrity of the modulo 2 addition equations. For a given shift S, $P_s$ is determined by the shift programmer.

Now referring to FIG. 6, a block diagram of a system for carrying out encryption in accordance with the encryption and decryption techniques discussed so far may be seen.

The clear test word is sent to its address in Memory I. This corresponds to selecting a word $X_{k-P_s}$ from column 3 other than $\theta$. The concept is to add it to its counterpart in column 2. If $X_{k-P_s}$ is other than $\theta$ and is to be added to $X_k$, this is equivalent to adding the word with order data $K-P_s$ in column 3 to the word with order $K-P_s+P_s=K$, also in column 3. Thus the order data of the clear test word $K-P_s$ is sent to the adder to be added to $P_s$. The new order number is sent to its address in Memory II. The content of that address is added modulo 2 to the clear test word to obtain the encrypted word $X_{k-s}$ in column 1. If the clear text word is $\theta$, its cipher test image is the same.

Adding of the order data is accomplished by two adders, carry (C) and least significant bit (LSB). The carry adder adds the numbers conventionally with carry, e.g. 001+011=100. However, if the addition requires more than n digits, that is, a 1 is carried to the n+1 position, that extra 1 is instead added to the first position, e.g., 100+110=1010>011. This is accomplished by the LBS adder. This is simply addition modulo m where $m=2^n-1$. In this example, n=3, m=7 and the addition expressed in decimal terms is $4+6=10\equiv3$ mod 7 where 100>4, 110>6 and 011>3.

Figure 7:
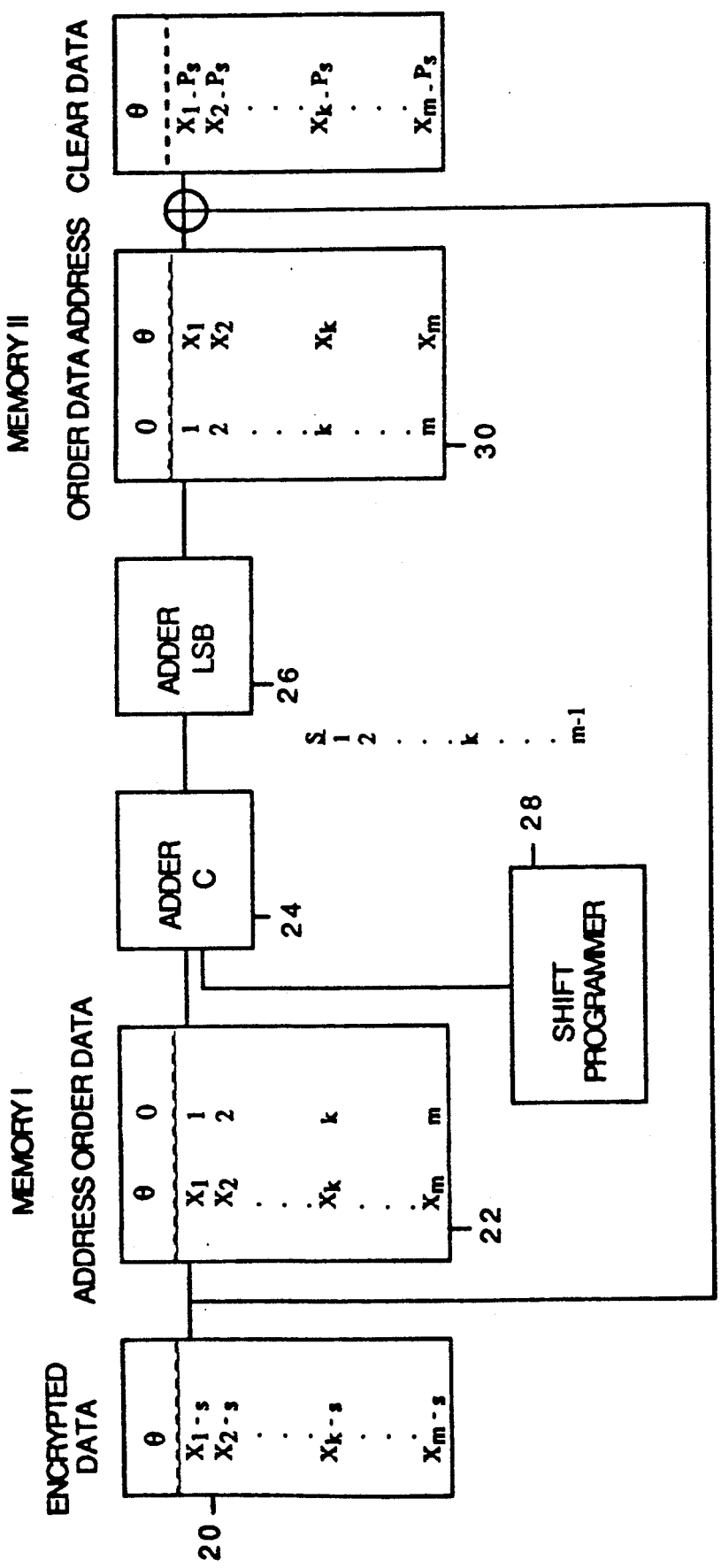
FIG. 7 is a block diagram of apparatus for decrypting data encrypted by the apparatus of FIG. 6.

The block diagram for decryption is shown at FIG. 7. The cipher text word is sent to its address in Memory I. This corresponds to selecting a word $X_{k-s}$ from column 1 other than $\theta$. The concept is to add it to its counterpart, $X_k$ in column 2. This is equivalent to adding $X_{k-s}$ in column 1 to the word with order data $K-s+s=K$, also in column 1. Thus the order data of the cipher text word, $K-s$ is sent to the adder to be added to s. The new order number is sent to its address in Memory II. The contents of that address is added modulo 2 to the cipher text word to obtain the decrypted word $X_{k-P_s}$ in column 3. If the cipher text word is $\theta$, it is decrypted as $\theta$.

The addition of order data, $K-S+S$ and $K-P_s+P_s$ is understood to be modulo m or with wraparound. That is, if the order data is greater than m, the last position, m is subtracted from the order data. If the cipher text word is $\theta$, it is decrypted as the same word.

The shift program determines the order in which the shifts, S, in column 1 are used, with the corresponding $P_s$ shift S in column 3. Any desired order can be used. The shift S corresponds to a power of the basic permutation described on Page 8, which determines the substitution by addition.

Figure 8:
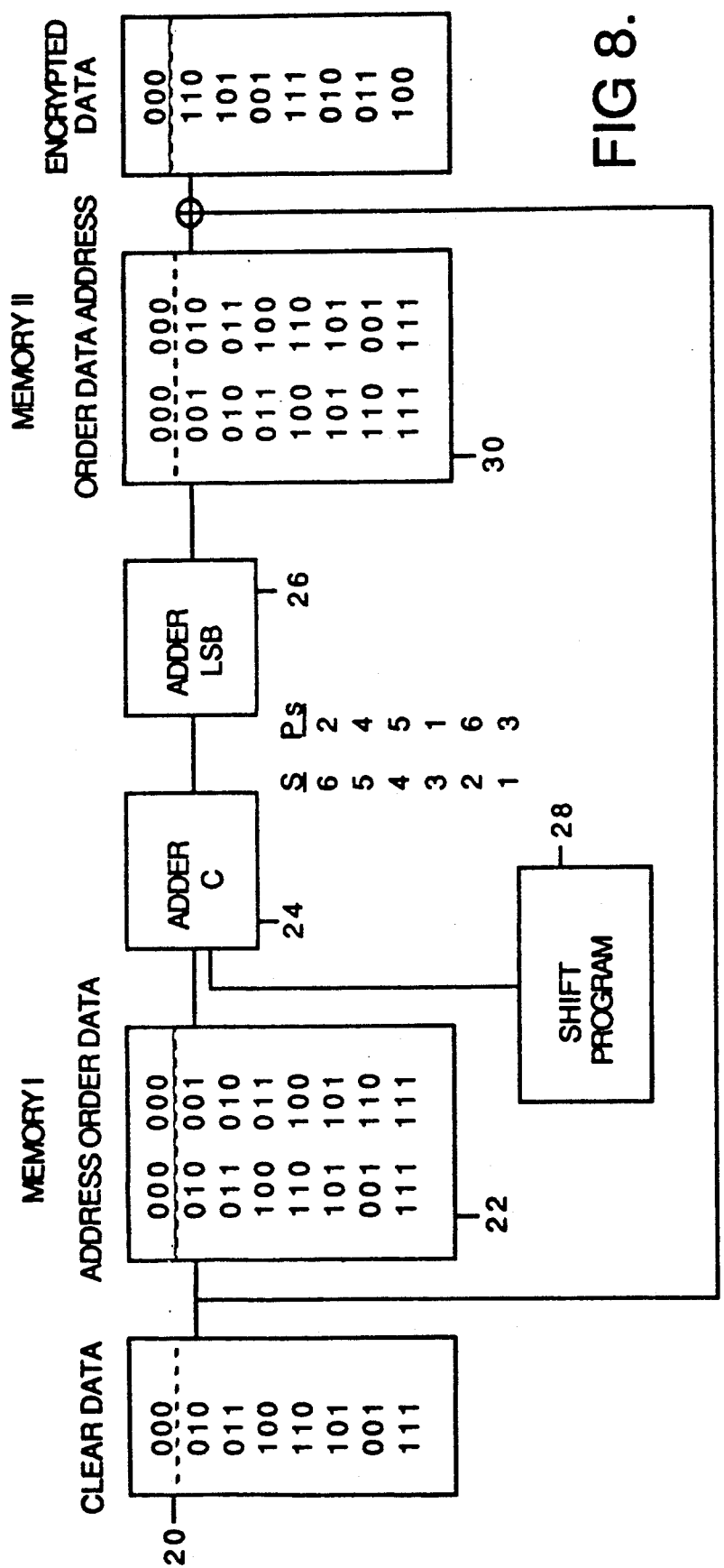
FIG. 8 is an example of encryption using FIG. 6.

Thus, by way of example, in FIG. 8, if the clear data value is 010, then that address in Memory I provides order data 001, which is binary notation that 010 is in position 1 in the sequence in Memory I (column 3 of the set of equations). The first shift position in the program is $S=6$, for which $P_6=2$. To the position of 010, $K-P_6=1$ is added $P_6=2$. In binary notation, $001+010=011$. Corresponding to the address 011 in Memory II is the number 100. (This is equivalent to saying that 100 is in position 3 in column 3). $110=100\oplus010$ is the cipher text word. This represents the first of the additive equations in FIG. 5.

For decryption, the cipher text word is 110. In FIG. 9, that address in Memory I provides order data 100, or position 4 in the sequence in Memory I. The first shift position in the program is $S=6$. To the position of 110, $K-6=4$, is added 6, or 110 in binary notation. $4+6=10$. Subtracting by $m=7$, $10-7=3$, or position 3 with wrap around. In binary notation, $100+110=011$ modulo 7. Corresponding to the address 011 in Memory II is the number 100. $110\oplus100=010$. This represents the first of the additive equations in FIG. 4.

If one adds Modulo 2 a fixed number to the first and second columns of FIG. 4. A still further one-to-one transformation results.

ENCRYPTION

| 1 | 2 | 3 |
|---|---|---|
| $(I \oplus Y) =$ | $(I \oplus Y) \oplus$ | $I$ |
| $(X_{1-s} \oplus Y) =$ | $(X_1 \oplus Y) \oplus$ | $X_{1-Ps}$ |
| $(X_{2-s} \oplus Y) =$ | $(X_2 \oplus Y) \oplus$ | $X_{2-Ps}$ |
| . | . | . |
| . | . | . |
| . | . | . |
| $(X_{k-s} \oplus Y) =$ | $(X_k \oplus Y) \oplus$ | $X_{k-Ps}$ |
| . | . | . |
| . | . | . |
| . | . | . |
| $(X_{m-s} \oplus Y) =$ | $(X_m \oplus Y) \oplus$ | $X_{m-Ps}$ |

DECRYPTION

| 1 | 2 | 3 |
|---|---|---|
| $(I \oplus Y) \oplus$ | $(I \oplus Y) =$ | $I$ |
| $(X_{1-s} \oplus Y) \oplus$ | $(X_1 \oplus Y) =$ | $X_{1-Ps}$ |
| $(X_{2-s} \oplus Y) \oplus$ | $(X_2 \oplus Y) =$ | $X_{2-Ps}$ |
| . | . | . |
| . | . | . |
| . | . | . |
| $(X_{k-s} \oplus Y) \oplus$ | $(X_k \oplus Y) =$ | $X_{k-Ps}$ |
| . | . | . |
| . | . | . |
| . | . | . |
| $(X_{m-s} \oplus Y) \oplus$ | $(X_m \oplus Y) =$ | $X_{m-Ps}$ |

Figure 11:
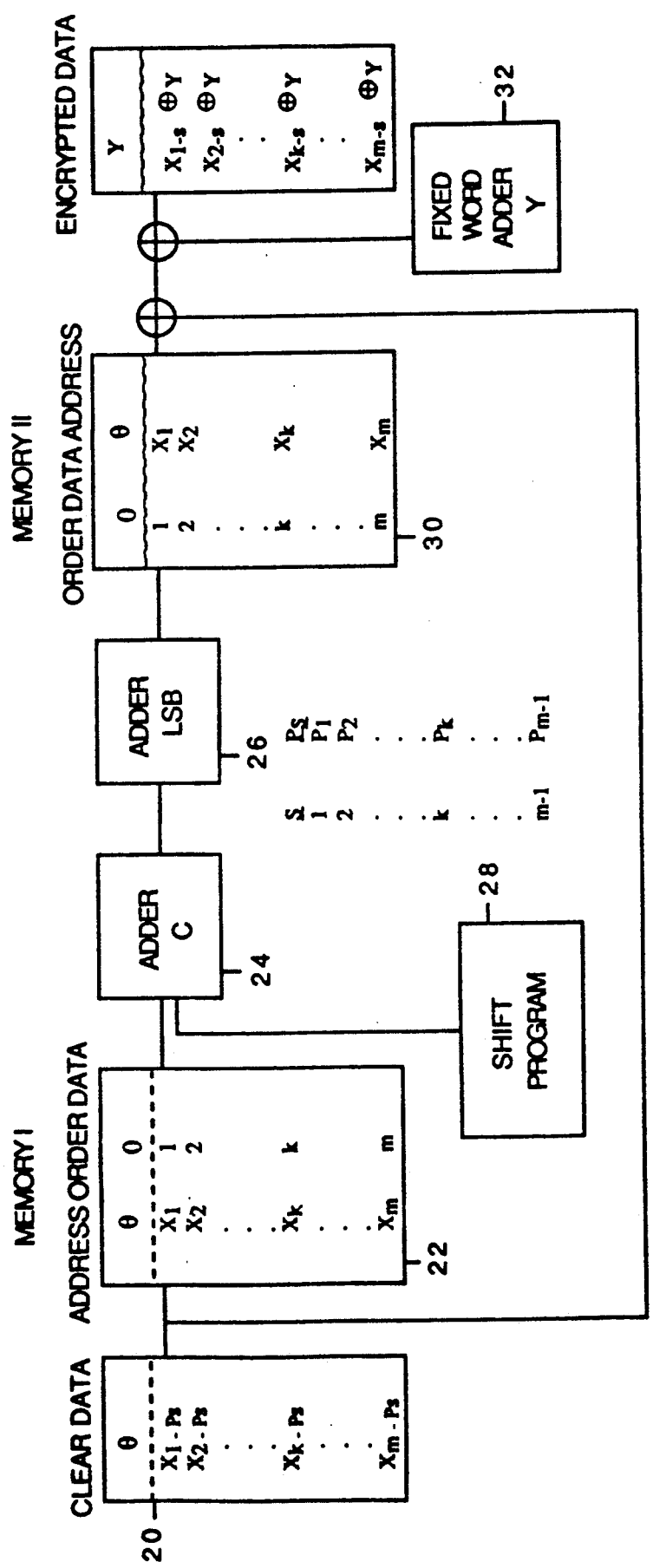
FIG. 11 is a block diagram for an apparatus for encrypting data in accordance with a set of transformation equations such as those of FIG. 10.
Figure 12:
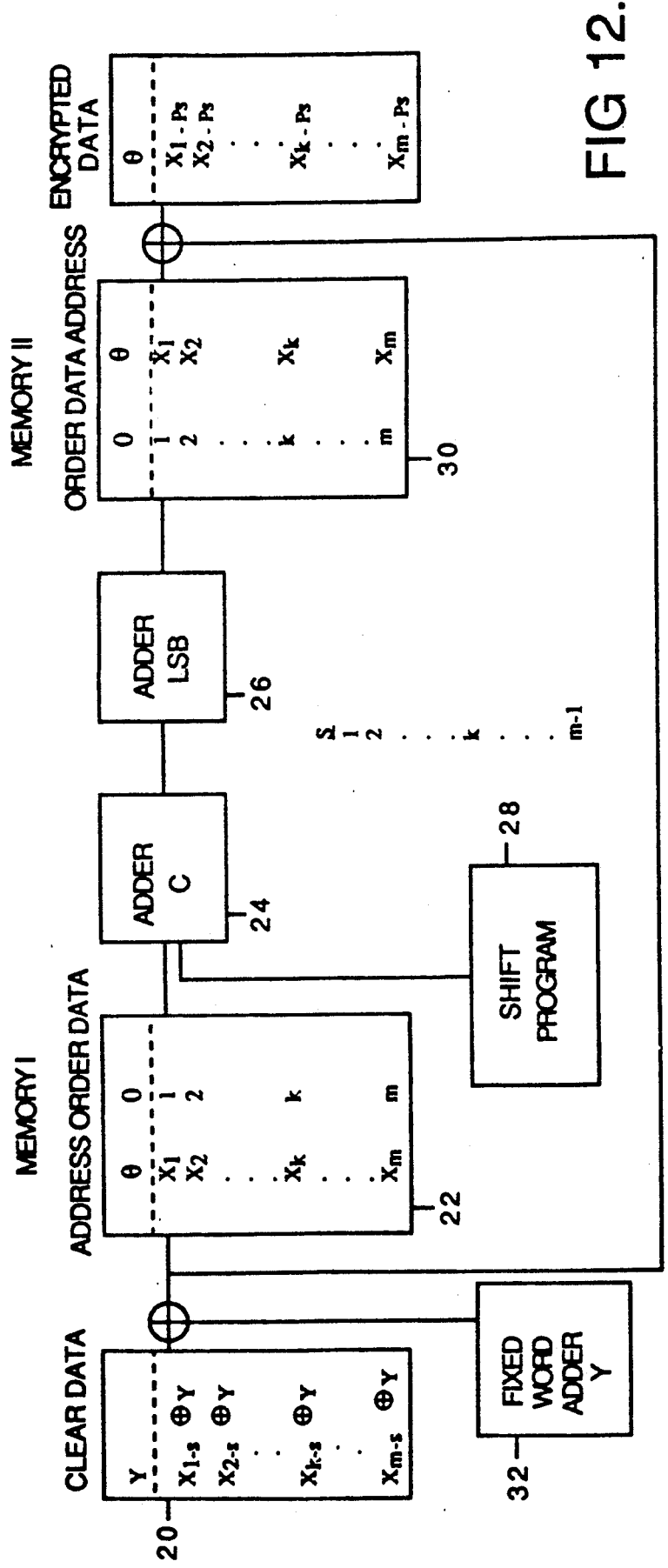
FIG. 12 is a block diagram for an apparatus for decrypting data encrypted with the apparatus of FIG. 11.

Now referring to FIGS. 11 and 12, for any block size a block diagram for carrying out encryption and decryption using a fixed word other than $\theta$, the zero word, may be seen. The procedure is essentially the same as before with the additional step of adding the fixed word Modulo 2 as the last step in the encryption process and the first step in the decryption process.

Figure 13:
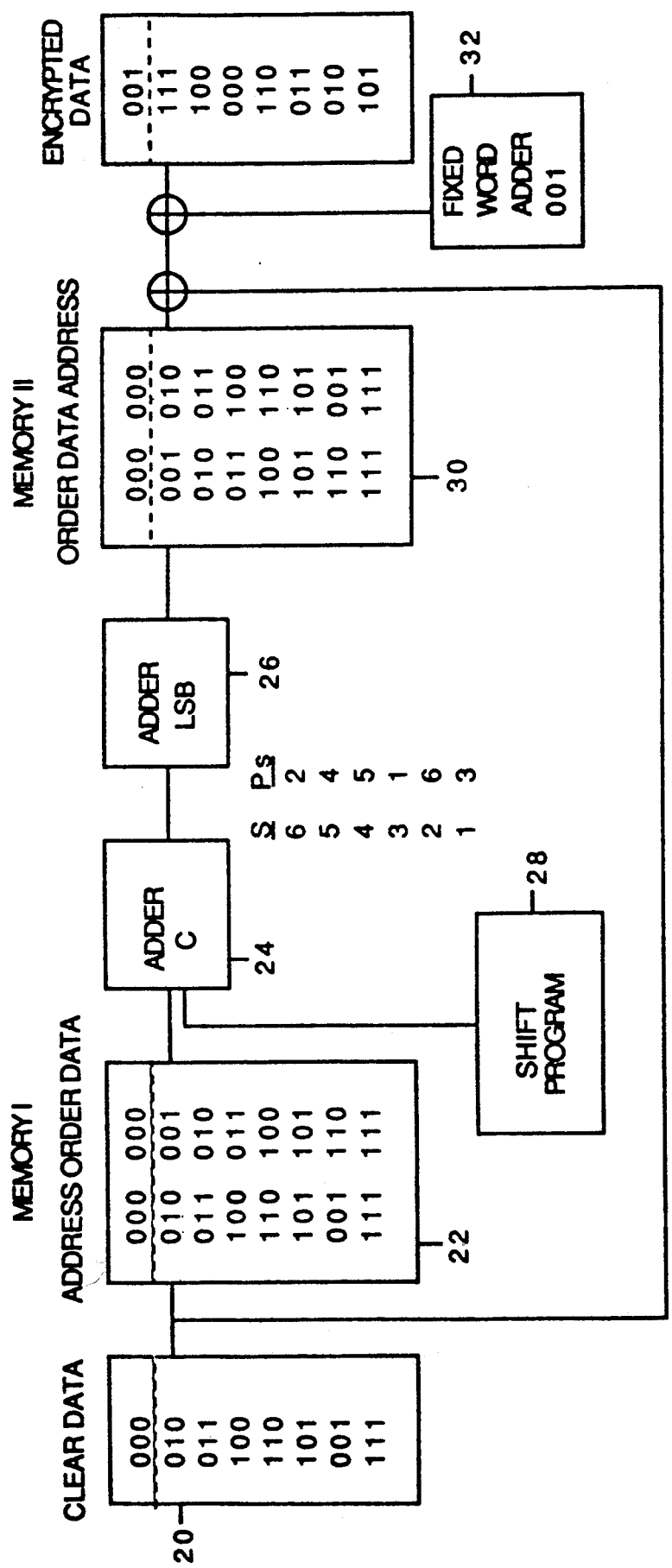
FIG. 13 is an example of encryption using FIG. 11.
Figure 14:
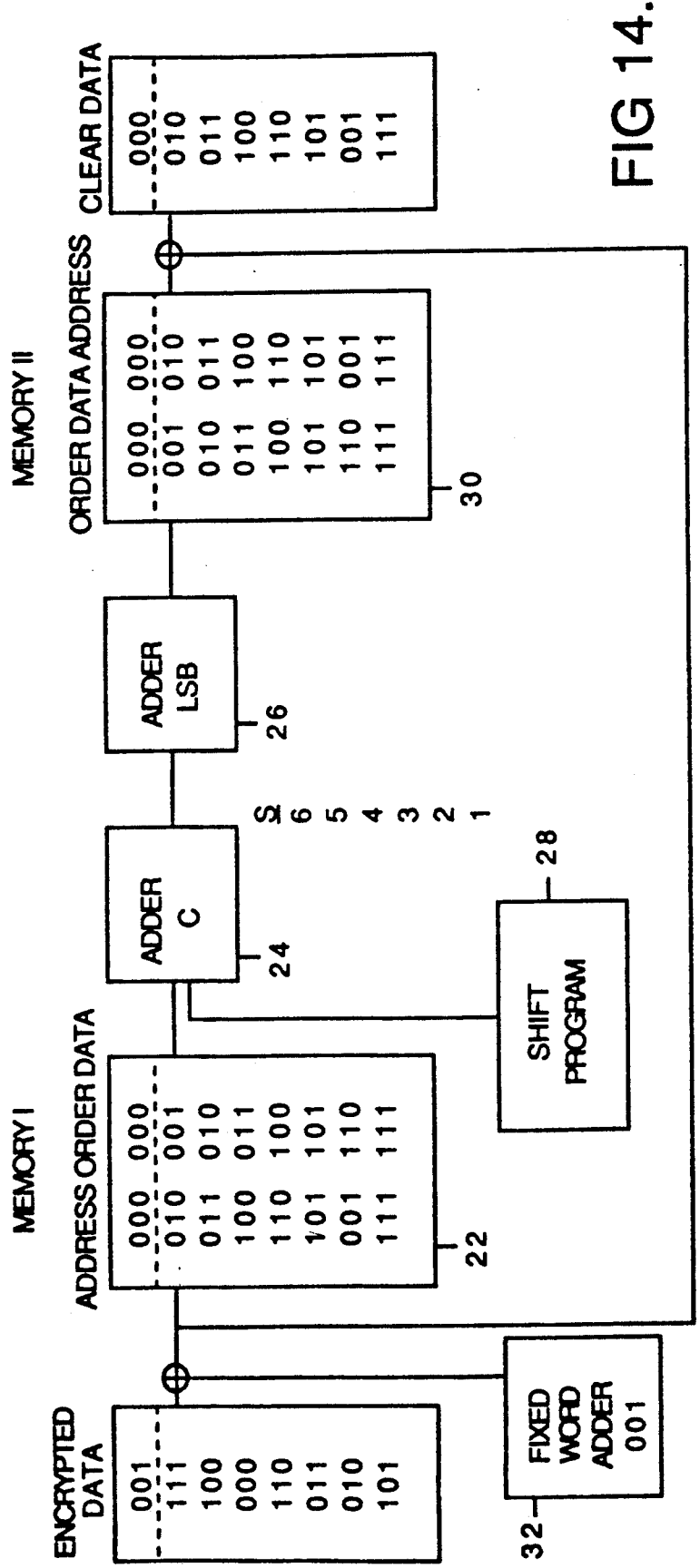
FIG. 14 is an example of encryption using FIG. 12

An example is shown in FIG. 13 and 14. In this case, 000 no longer remains fixed, but is transformed into 001. Now 110 is transformed to itself and thus becomes fixed in this case.

The fixed word adder can add in succession any or all of the n bit words in whatever order is selected by the user.

Now referring to FIG. 8, as an example, a block diagram of a system for carrying out encryption in accordance with the encryption and decryption techniques discussed so far may be seen. As shown in the figure, any value of the clear data 20, except 000, is provided as an address to memory 22. Stored at the various memory addresses is the order data for the clear data value, that is, the position, expressed as a binary number, of that clear data value in the ordered sequence of the right column of FIG. 4 (and FIGS. 5 and 10). This position is provided as an output of the memory 22 to an adder shown as the combination of adders 24 and 26. The adders are coupled to add the output of the memory to a value of shift $P_s$ as controlled by shift programmer 28. This addition is not a modulo 2 addition but rather is the normal binary add, with the one exception that the carry from the most significant bit is coupled to the carry in of the least significant bit. Thus, the adder will provide the result 001 as the sum 1 larger than 111, not 1000 or simply 000. Thus, it may be seen that the output of the adders is a new three bit binary number shifted in the order data sequence by an amount $P_s$. This new position is then used as the address for memory 30, which provides as its output the three bit binary number corresponding to the value in column 2 of FIG. 4, or the corresponding clear data value in FIG. 3. Thus, by way of example, if the clear data value is 010, that value as an address to memory I provides the location of that value of 001 in the sequence. If the shift program selects $S=6$, then $P_6=2$ and column 3 is shifted downward two positions from column 2 or by an amount 010. The three bit binary number which would then be adjacent to the clear data value of 010 is 100 as in FIG. 5. This added modulo 2 to the clear data 010 provides an encrypted value of 110, corresponding to the value shown in FIG. 5. However, if the clear text data value is 000, that value as an address to Memory I provides the location of the value of 000 in the sequence. It is not shifted but provided unchanged as the order data in memory 30. Thus 000 added to itself, remains fixed.

The downward shift $P_s$ of the sequence of column 3 of FIG. 5 in comparison to the basic order data of column 2 of FIG. 5 of course corresponds to a complimentary upward shift. Thus, for an n bit block, a downward shift of $P_s$ is equivalent to an upward shift of $m-P_s$. Note also that for a three bit block, all values of possible shift provide the desired one-to-one mapping except for a shift of the first column with respect to the second column of zero, and of 7 and multiples thereof, as such shifts would provide a second column in the matrix having each row the same as the corresponding row of the first column, and any number added to itself modulo 2 will be zero. Thus, for a shift of seven or multiples thereof, all clear data values map to 000, useless for encryption purposes. In general however, it will be shown later that for n bit blocks larger than three bits, all shifts other than zero and integer multiples of m give the desired result and thus are usable in accordance with the present invention.

The block diagram for decryption in accordance with FIG. 7 is shown in FIG. 9. From a hardware standpoint, this diagram is exactly the same as that of FIG. 8 for encryption, the decryption differing only in the shift S applicable for a given shift $P_s$ for encryption. As in the example on page 14, for a shift $P_s$ of 2 for encryption, a shift 6 provides the proper decryption, etc., as shown in the tables of FIGS. 8 and 9. Obviously, the encryption hardware and the decryption hardware must be using the associated shifts for the clear data to be properly recovered on decryption, though the applicable shift may be varied frequently at both ends to make cryptanalysis very difficult, if not virtually impossible.

If one adds modulo 2 a fixed number to any pair of columns of FIG. 5, a still further one-to-one transformation results. By way of example, in FIG. 10 the fixed number 001 has been added modulo 2 to the first and second columns of FIG. 5. Now 010 as a clear text word maps into an encrypted word 111, whereas in the example of FIG. 8, 010 mapped into 110.

An example of a block diagram for the encryption using a fixed word adder may be seen in FIG. 13. This figure is identical to FIG. 8 with the exception that the fixed word adder 32 has been included to add the fixed word (001 in the example) to the output of memory 30 corresponding to the value in the same row of the second column as 010 of the first column. Thus, the fixed word adder merely adds the fixed word (001 in the example) to the column 2 value, after which the clear text word is added modulo 2 thereto to obtain the encrypted data. Again for the example, using clear data of 010 as the address to memory 22, the output of the memory will be 001. Using the same shift as in the example of FIG. 8, 010, $P_s=2$ is added to the 001, to provide an address to memory 30 of 011. This results in an output from memory 30 of 100, to which fixed word adder 40 adds modulo 2, the fixed word 001, yielding 101. This added modulo 2 to the clear text word 010 gives the encrypted word 111 as shown in FIG. 10.

A block diagram for decryption, corresponding to the block diagram for encryption of FIG. 13, is shown in FIG. 14. As may be seen, FIG. 14 is identical to FIG. 13 (though the shifts for decryption are again different from the shifts for encryption), with the exception of the fixed word adder also adding modulo 2 the fixed word to the encrypted data before the same is applied to memory 22. This modulo 2 addition is in essence the second modulo 2 addition of the fixed word, as a first modulo 2 addition of the fixed word was done in FIG. 11 to get the encrypted word. Thus, since a second modulo 2 addition of the same word in effect cancels the first modulo 2 addition so that after the encrypted data in FIG. 12 has the fixed word added modulo 2 thereto, the result of that modulo 2 addition may be used with the equations of FIG. 10 for decryption purposes. Thus, by way of example, using the encrypted word 111 of the example of FIG. 13, $111 \oplus 001 = 110$ as the address to memory 22 of FIG. 14. This gives a memory output of 100, to which the value of $S=6$ or 110 is added. $100+110=1010>011$ with wrap-around. This in turn gives an address of 011 to memory 30 or an output thereof of 100, to which is added modulo 2 110, the address to memory 22, to recover the clear text data 010. Further of course, while the fixed word adder of FIGS. 13 and 14 used a fixed word 001, any other 3-bit fixed word may be used, or for that matter, the fixed word may be varied from time to time with or separate and apart from variations in the shift, a fixed word of 000 essentially reducing the operation of the system to that of FIGS. 8 and 9.

Obviously, the methods described in relation to FIGS. 6, 7, 11 and 12 may readily be carried out with a microprocessor based system under program control. Alternatively, the memory could readily be preprogrammed in read only memory used essentially as lookup tables, and the adders and modulo 2 adders could readily be conventional adder circuitry so that at least the major elements of an encryption and decryption system could be realized in either high speed discrete components or through a custom integrated chip. The shift program also could take various forms depending upon how often a shift is desired, the extent to which the shift order is itself varied, etc., microprocessor based, integrated circuits or other realizations being readily applicable, including shift register implementations as desired.

While a preferred embodiment for the encryption and decryption of the present invention has been disclosed and described herein, it will be obvious to one skilled in the art that various changes in form and detail may be made therein without departing from the spirit and scope of the invention.

I claim:

1. A method of encryption by substituting for any one of the $2^n$ unique clear text blocks of n bit binary numbers an associated unique encrypted block of n bit binary numbers comprising the steps of;
    (a) finding a first set of $2^n$ equations, each equation representing the modulo 2 addition of one of the $2^n$ clear text blocks with a unique one of $2^n$ n bit numbers to provide the associated unique encrypted n bit block, equations in the first set of $2^n$ equations being characterized by the sum modulo 2 of any odd number of the equations being another one of the equations in the first set, where the blocks in each position of a given equation are added modulo 2 to the corresponding blocks in the other equations, whereby any clear text block can be converted into an associated encrypted block by the one to one mapping defined by the $2^n$ equations;
    (b) for each clear text block to be encrypted, adding modulo 2 to that block, the unique one of the $2^n$ bit numbers associated therewith in accordance with the associated equation of the first set of $2^n$ equations to obtain the encrypted block.

2. The method of claim 1 further comprising the decryption of the encrypted blocks comprising the further steps of;
    (c) finding a second set of $2^n$ equations, each equation representing the modulo 2 addition of one of the $2^n$ encrypted blocks with a unique of $2^n$ bit numbers to provide the associated unique clear text n bit block, the second set of $2^n$ equations containing columns corresponding to those in the first matrix of $2^n$ equations with the symbol $\oplus$ and = thereof interchanged, whereby any encrypted block can be converted into an associated clear text block by the one to one mapping defined by the second set of $2^n$ equations;
    (d) for each encrypted block to be decrypted, adding modulo 2 to that block, the unique one of the $2^n$ n bit numbers associated therewith in accordance with the associated equation of the second set of $2^n$ equations to obtain the decrypted or clear text block.

3. The method of claim 1 wherein one of the equations in the first set is the identity equation mapping the zero value onto itself, and wherein the equations can be ordered in the form:

$$\begin{aligned}
\theta \oplus \theta &= \theta \\
x_m \oplus x_1 &= X_{1-P} \\
x_1 \oplus x_2 &= X_{2-P} \\
&\vdots \\
x_{m-1} \oplus x_m &= X_{m-P}
\end{aligned}$$

4. The method of claim 3 further comprising the decryption of the encrypted blocks comprising the further steps of;
  (c) finding a second set of $2^n$ equations, each equation representing the modulo 2 addition of one of the $2^n$ encrypted blocks with a unique one of $2^n$ n bit numbers to provide the associated unique clear text n bit block, the second set of $2^n$ equations containing columns corresponding to those in the first set equations with the symbols $\oplus$ and $=$ thereof interchanged, whereby any encrypted block can be converted into an associated clear text block by the one to one mapping defined by the second set of $2^n$ equations;
  (d) for each encrypted block to be decrypted, adding modulo 2 to that block, the unique one of the $2^n$ n bit numbers associated therewith in accordance with the associated equation of the second set of $2^n$ equations to obtain the decrypted or clear text block.

5. The method of claim 3 wherein one of the equations in the first set is the identity equation mapping the zero value onto itself, and wherein the equations in the first set can be generated from a set of original equations ordered in the form:

$$\begin{aligned}
\theta \oplus \theta &= \theta \\
X_{1-s} \oplus x_1 &= X_{1-P_s} \\
X_{2-s} \oplus x_2 &= X_{2-P_s} \\
&\vdots \\
X_{m-s} \oplus x_m &= X_{m-P_s}
\end{aligned}$$

the equations in the first set being generatable from the foregoing set of original equations by shifting with wrap around and by any predetermined integer s, the n bit numbers in either of the first two columns of the set, and by shifting with wrap around and by a second predetermined integer Ps dependent on the first predetermined integer s, the n bit numbers in the third column of the set, the foregoing shifts involving all equations of the set except the identity equation.

6. The method of claim 5 further comprising the decryption of the encrypted blocks comprising the further steps of;
  (c) finding a second set of $2^n$ equations, each equation representing the modulo 2 addition of one of the $2^n$ encrypted blocks with a unique one of $2^n$ bit numbers to provide the associated unique clear text n bit block, the second set of $2^n$ equations containing columns corresponding to those in the first set of $2^n$ equations with the symbols $\oplus$ and $=$ thereof interchanged, whereby any encrypted block can be converted into an associated clear text block by the one to one mapping defined by the second set of $2^n$ equations;
  (d) for each encrypted block to be decrypted, adding modulo 2 to that block, the unique one of the $2^n$ n bit numbers associated therewith in accordance with the associated equation of the second set of $2^n$ equations to obtain the decrypted or clear text block.

7. The method of claim 5 wherein the amount of the shifts is varied from time to time as successive n bit blocks are encrypted.

8. The method of claim 5 wherein one of the equations in the first set is the identity equation mapping the zero value onto itself, and wherein the equations in the first set can be generated from a set of equations ordered in the form:

$$\begin{aligned}
Y \oplus Y &= \theta \\
(X_{1-s} \oplus Y) \oplus (X_1 \oplus Y) &= X_{1-P_s} \\
(X_{2-s} \oplus Y) \oplus (X_2 \oplus Y) &= X_{2-P_s} \\
&\vdots \\
(X_{m-s} \oplus Y) \oplus (X_m \oplus Y) &= X_{m-P_s}
\end{aligned}$$

the equations in the first set being generatable from the forgoing set of equations by;
  (e) shifting with wrap around and by a first predetermined integer s, the n bit numbers in the first column of the set, and shifting with wrap around and by a second predetermined integer $P_s$ dependent on the first predetermined integer, the n bit numbers in the third column of the set, the foregoing shifts involving all equations in the set except the identity equation, and;
  (f) adding modulo two, any n bit number Y to the n bit numbers in the first and the second columns of the set, including the identity equation.

9. The method of claim 8 wherein the amount of the shifts is varied from time to time as successive blocks of n bit blocks are encrypted.

10. The method of claim 8 wherein the n bit number added in step (f) is varied from time to time as successive blocks of n bit blocks are encrypted.

11. The method of claim 8 wherein both the amount of the shifts and the n bit number added in step (f) are varied from time to time as successive blocks of n bit blocks are encrypted.

12. The method of claim 8 further comprising the decryption of the encrypted blocks comprising the further steps of;
  (c) finding a second set of $2^n$ equations, each equation representing the modulo 2 addition of one of the $2^n$ encrypted blocks with a unique one of $2^n$ n bit numbers to provide the associated unique clear text n bit block, the second set of $2^n$ equations containing columns corresponding to those in the first set of $2^n$ equations with the symbols $\oplus$ and $=$ thereof interchanged, whereby any encrypted block can be converted into an associated clear text block by the one to one mapping defined by the second matrix of $2^n$ equations;
  (d) for each encrypted block to be decrypted, adding modulo 2 to that block, the unique one of the $2^n$ n bit numbers associated therewith in accordance with the associated equation of the second set of $2^n$ equations to obtain the decrypted or clear text block.

* * * * *